Aug. 14, 1956 G. E. KAUFMAN 2,758,431
KNIFE SHARPENER ATTACHMENT FOR MIXER
Filed Oct. 13, 1954 3 Sheets-Sheet 1

Aug. 14, 1956

G. E. KAUFMAN 2,758,431

KNIFE SHARPENER ATTACHMENT FOR MIXER

Filed Oct. 13, 1954

# United States Patent Office 2,758,431
Patented Aug. 14, 1956

2,758,431

KNIFE SHARPENER ATTACHMENT FOR MIXER

George E. Kaufman, Canton, Ohio, assignor to The Hoover Company, North Canton, Ohio, a corporation of Ohio Application October 13, 1954, Serial No. 461,974

11 Claims. (Cl. 51—241)

This invention relates to food mixers and more particularly to a multi-purpose grinding attachment therefor for grinding both knives and scissors.

More particularly, the present invention relates to an attachment for a mixer of the type having oppositely rotating spaced apart power shafts which normally are detachably connected to the mixer shafts.

The mixer unit to which the present invention is applied is of the portable type and so made that the power unit may be supported on its heel in a substantially vertical position with the oppositely rotating power shafts extending horizontally so that the grinding attachment will extend laterally therefrom and in position for use. The power shafts are so rotated that the peripheries of the shafts which face each other are moving upwardly when the unit is resting on its heel.

Broadly the grinding attachment is in a form of a thermoplastic casing in which grinding wheels are rotatably mounted on shafts which extend from the casing and enter sockets in the power shaft spindles of the mixer unit so as to form the sole support for the attachment.

One wall of the casing is formed with a knife blade guide in the proper relationship to the grinding wheels and a scissors blade guide is formed in the opposite wall in proper relationship to a grinding wheel whereby the attachment may be inverted for grinding either knife blades or scissors blades.

The grinding attachment has two oppositely rotating grinding wheels rotatably mounted on shafts extending from the side of the casing and formed for detachable connection to the oppositely rotating shafts of the mixer power unit so that the shafts form the sole support for the attachment. The wheels have overlapping grinding faces which move upwardly when the attachment is attached to the power unit.

The grinding wheels are beveled adjacent their peripheries and are spaced apart slightly, axially of their shafts. The wheels overlap each other slightly at their edges so that a knife blade with its opposite sides placed in contact with the beveled faces of the wheels at an angle to the shaft axes, the blade will contact the wheels considerably below the top of the wheels, and as a result the sides of the knife will contact a rounded portion of the periphery of the bevel and the knife edge wil be hollow ground. A blade guide is formed in the top of the casing at the proper angle and depth that the blade will contact the beveled periphery of the wheels in the above described manner.

By varying the diameter of the wheels, the amount of the overlapping, the angle of the bevel and the angle of the blade guide, the shape of the hollow ground edge may be varied.

The blade guide is formed in the upper side of the casings so that when the attachment is attached to a mixer unit resting on its heel, the guide slot will face upwardly in a convenient position to be used for grinding knife blades.

The lower portion of the casing is cut away to expose the side face of one of the grinding wheels and a ledge or guide is formed in the casing along side of the exposed grinding wheel to form a guide for the blade of a pair of shears or scissors. The ledge slopes at an angle to the base of the wheel so that the edge of the blade is ground at the proper angle.

The arrangement is such that the entire attachment may be detached from the mixer unit and inverted whereby the scissors blade guide will face upwardly in a convenient position for sharpening scissors blades.

Other objects and advantages of the preesnt invention will become apparent as the description proceeds when taken in connection with the accompanying drawings in which.

Figure 2:
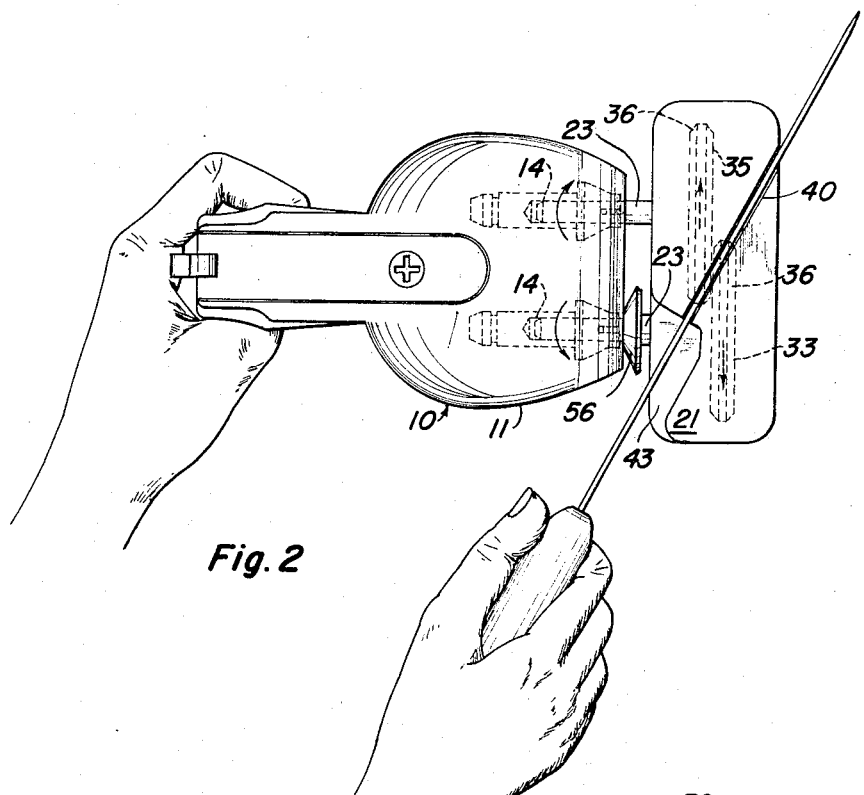
Fig. 2 is a top view looking downwardly on the mixer of Fig. 1 and showing how a knife blade is ground.

Referring to the drawings the mixer power unit is indicated by the reference numeral 10 and comprises a casing 11 with a cantilever handle 12 attached to its forward end. The end of the handle 12 and lugs 13, one of which is shown at 13, which extend from the heel of the casing 11, form supports upon which the power unit 10 may be supported on its heel. The power unit 10 is provided at its upper end opposite the handle 12 with oppositely rotating socketed shafts 14, having power take-off sockets for normally detachably receiving the ends of the mixer shafts. The joint between the power take-off sockets and the mixer shafts are of the snap-on type which are well known in the art and need not be further described herein.

The attachment of the present invention is generally indicated by the reference numeral 20 and is in the form of a sectional casing comprising an open sided section 21 and a complemental open sided section 22 which telescopes into the open side of section 21 to form the complete casing.

Figure 3:
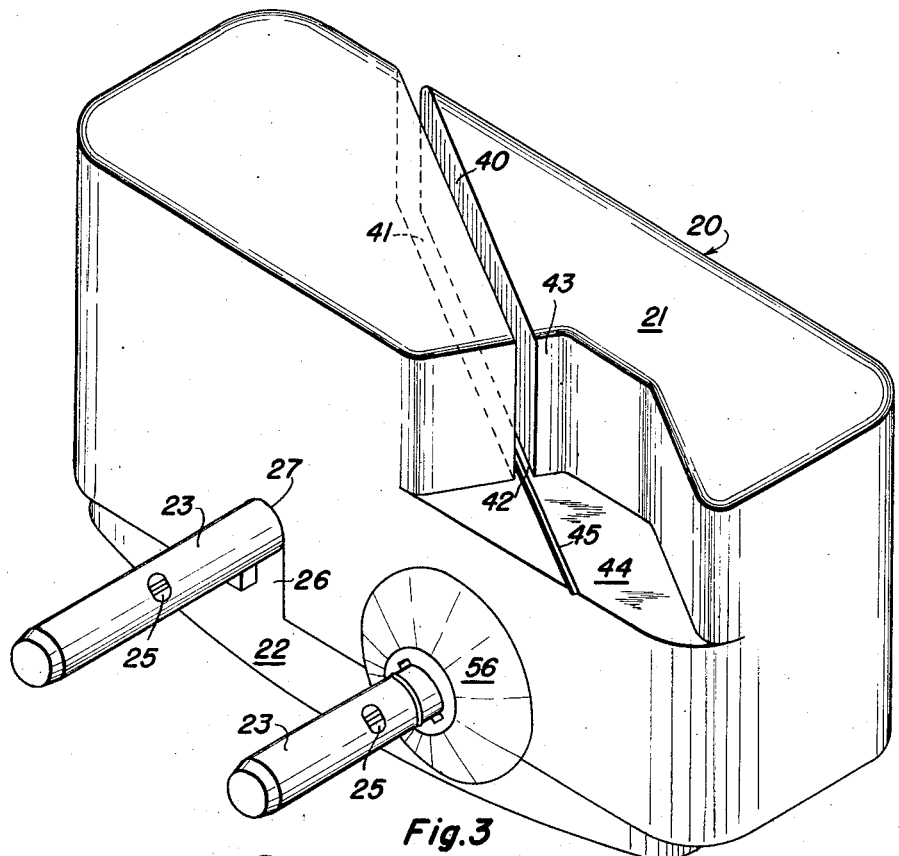
Fig. 3 is a perspective view of the grinding attachment of the present invention.

Sections 21 and 22, adjacent their mating edges are formed with bearings for rotatably supporting a pair of shafts 23. The ends of the shafts 23 project from one side of the attachment 20 as shown in Fig. 3 and are provided with snap-on driving connections 25 to interfit with complemental driving connections formed in sockets in the driving shafts of the power unit 10 and to thus form the sole support for the attachment 20.

The edge of section 20 is notched as shown at 26 to receive the shafts 23. The notches 26 are rounded at 27 to form a half bearing for one end of the shafts 23. The edge of section 22 is formed with rounded notches, one of which is shown at 28 to form the other half bearing for that end of the shafts 23.

The other ends of the shafts 23 are supported in round ended grooves, one being shown at 29, formed in a wall of section 21 opposite the notches 26 to form half bearings, the other half being formed by rounded notches, one shown at 30, formed in the edges of section 22.

The shafts 23 are formed with annular lands 31 forming shoulders to prevent end-play of shafts 23 in one direction, end-play in the other direction being prevented by engagement of the other end of the shafts against the wall of section 21 at the notch 29 as shown.

The sections 21 and 22 are made of die molded thermoplastic material which takes a smooth finish when molded so that no lubrication is necessary.

Figure 6:
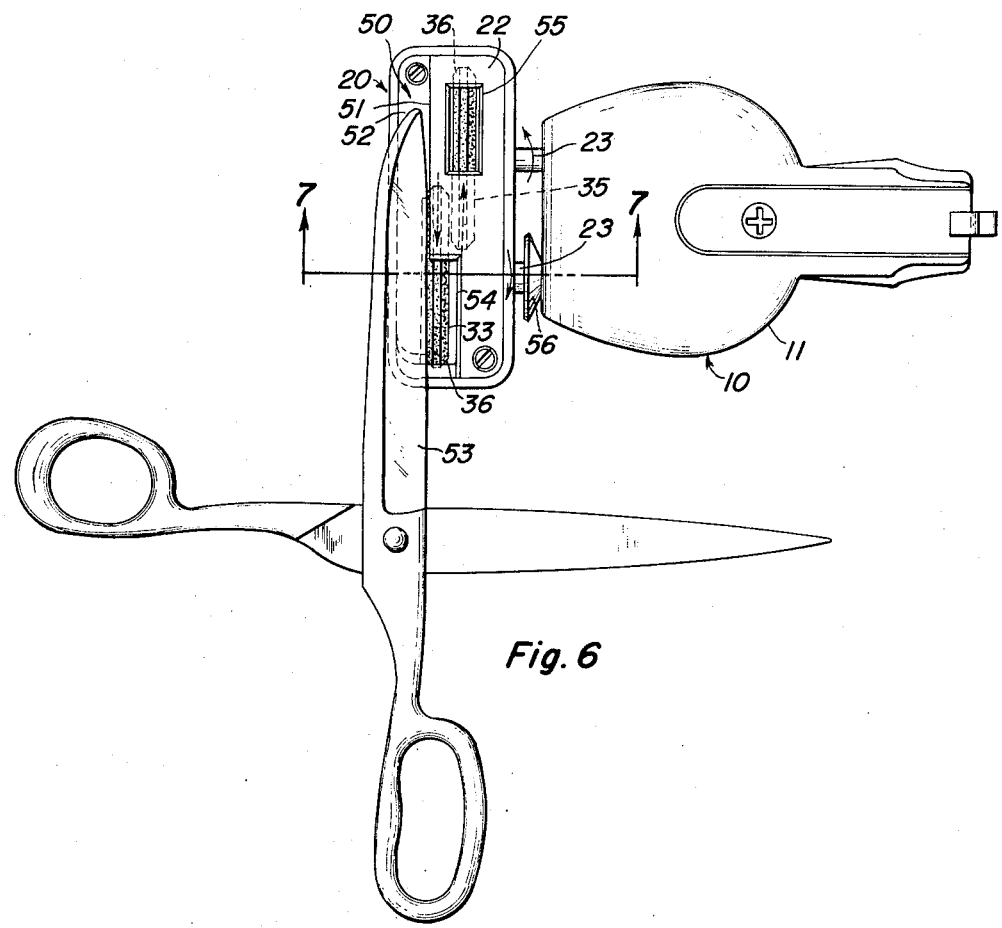
Fig. 6 is a top view similar to Fig. 2 showing the attachment inverted and a scissors blade being sharpened.

Shafts 23 are also provided with an annular land 32 to form a shoulder against which one side of the grinding wheel 33 abuts, the opposite side being engaged by a threadless fastener 34. The grinding wheel 35 is axially offset from the wheel 33 so that the wheels are spaced slightly from each other and their edges overlap as shown in Figs. 2 and 6.

The grinding wheels 33 and 35 are formed with beveled edges or areas 36 for a purpose which will presently appear. In use the overlapping edges of wheels 33 and 35 rotate upwardly as shown by the arrows in Figs. 2 and 6 since the power shafts 14 rotate as shown by the arrows in those figures.

A knife blade guide in the form of a groove 40 is formed in the closed end of the section 21 and extends downwardly to lands 41 and 42. The top left corner of section 22 as viewed in Fig. 3 is indented at 43 to form a space for receiving the handle of a knife to be ground so that the blade may be ground to its heel end. The bottom 44 of the indentation 43 is formed with a groove 45 for receiving the sharp edge of a knife blade to be sharpened.

The distance between the shafts 23 is fixed by the distance between the driving shafts 14 of the particular mixer power unit to which the attachment 20 is to be attached.

Figure 4:
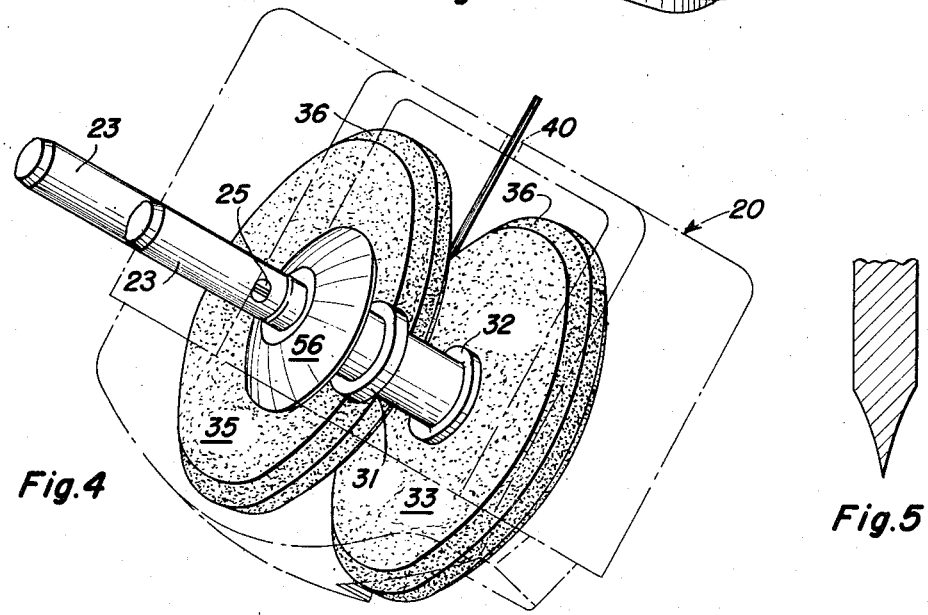
Fig. 4 is a phantom view of the interior of the grinding attachment showing how the knife blade contacts the grinding wheels.
Figure 5:
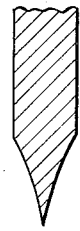
Fig. 5 is an enlarged sectional fragmentary view of the edge of a knife blade after it has been ground.

The diameter of the wheels 33 and 35 are then selected relative to the angle of the beveled areas 36 so that the point of contact of a knife blade lying in surface engagement with the beveled areas will be below the top of the wheels 33 and 35 so that the moving surface of the wheels is engagement with the opposite sides of the knife blade is arcuate to simultaneously hollow grind the opposite sides of the knife blade as shown exaggerated in Fig. 5. The way in which the opposite sides of the knife blade engage the beveled edges or surfaces 36 is best shown in the phantom view of Fig. 4.

The angle of the guide slot 40 and its depth down to the lands 41 and 42 is chosen so that the knife blade will engage the grinding wheel in the above manner. In actual practice, in order to compensate for wear of the wheel when in use, the angle of the slot 40 is so chosen that the sides of the knife blade will engage the top area of the beveled surface 36 slightly before it engages the bottom area. However, in order to prevent forming nicks in the knife blade, a substantial area of beveled surface 36 must contact the opposite sides of the knife blade.

By altering the extent of overlap of the grinding wheels, the depth of the slot 40 and the angle of the beveled surface 36, the shape of the hollow ground edge may be varied, that is, it may be made rather short and blunt or long and pointed.

Figure 7:
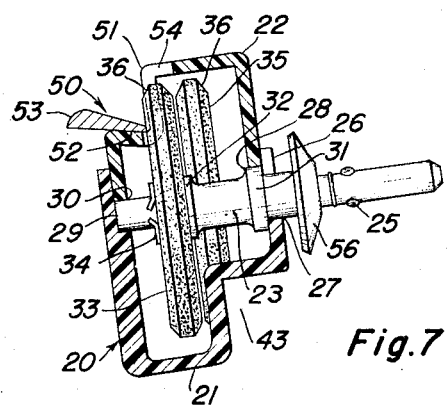
Fig. 7 is a sectional view taken from line 7—7 of Fig. 6 and looking in the direction of the arrows.

On one corner of its closed end, the section 22 is formed with a guideway 50 having a vertical guiding surface 51 and a guiding surface 52 which slopes outwardly from the surface 51 at an angle to hold the edge of a scissors blade 53 at the proper angle as shown in Fig. 7. The wall forming the guide surface 51 is cut away at 54 adjacent the sides of the wheel 33 so that the flat side of that wheel is exposed, the arrangement being such that when a scissors blade is in contact with the guide surfaces 51 and 52 it will contact the side surface of wheel 33 at the proper angle as shown. The closed end of the section 22 is also provided with an opening 55 (Fig. 6) to expose the wheel 35 so that the shaft 23 may be rotated to align the driving lugs 25 with the complemental driving means of the driving shaft 14 of the power unit 10. Wheel 33 may also be rotated thru opening 54 to similarly align the lugs of shaft 24.

An ejector ring 56 is loosely mounted on the shaft 24 so that when the attachment 20 is attached to the power unit 10 it is in substantial contact with the outer wall of the casing 11.

Operation

Figure 1:
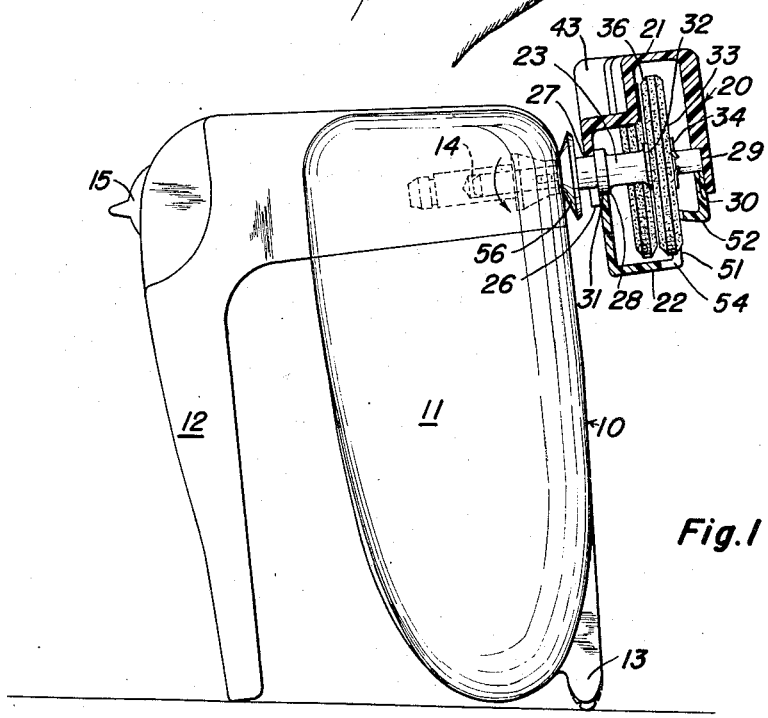
Fig. 1 is a side view of a mixer power unit resting on its heel showing the grinder unit of the present invention attached thereto.

If it is desired to sharpen knives the mixer power unit is placed on its heel as shown in Fig. 1, the ends of the shafts 23 inserted in the driving shaft sockets 14 of the power unit 10, with the guide slot 40 facing upwardly, the wheels 33 and 35 rotated thru access openings 54 and 55 to align the driving lugs 25 with complemental driving means in the driving sockets 14 and the unit 20 pressed inwardly to engage the complemental snap-on connections between the shafts 23 and the driving shafts.

The motor of the mixer unit may then be energized by closing the switch 15 and knife blades sharpened in the manner shown in Fig. 2. The handle 12 of the power unit 10 may be grasped in the left hand and the knife handle in the right hand with the blade extending along guide groove 40 and the edge of the blade resting in groove 45. The knife is then moved back and forth over the beveled surface 36 of the grinding wheels, care being taken not to hold the knives stationary at any one point. During such movement the surfaces 36 of the grinding wheels will be moving upwardly across the sides of the blade and since the surfaces 36 are arcuate at that point or at the areas of contact with the blade, both sides of the blade will be hollow ground simultaneously as shown in Fig. 5.

Since the grinding surfaces are moving upwardly, it will be necessary for the operator to apply a slight downward pressure on the knife blade as it is moved back and forth across the surfaces. That, however, is a distinct advantage as it aids the operator in moving the blade evenly and prevents the formation of nicks and gouges in the knife edge.

If it is then desired to sharpen the blades of a scissors, one edge of the ejector ring 56 is pressed toward the attachment 20 which will cause it to contact the casing 11 of the power unit and exert an outward pull on the shafts 23 sufficient to release the snap-on driving connection between those shafts and the driving shafts of the power unit 20. The attachment 20 is then removed and inverted as shown in Fig. 7 with the guide surface 52 facing upwardly. The snap-on connections may then be engaged as before and the device used to sharpen scissors blades as shown in Fig. 6. Care should be taken that the flat side of the blade rests firmly on the guide surface 52 and that the cutting edge of the blade rests against the guide surface 51. In that position the cutting edge of the blade will contact the side surface of grinding wheel 33 at the proper angle. The blade may then be moved back and forth across the side of the wheel 33, care being taken not to hold the blade stationary at any one point.

From the foregoing it can be seen that the present invention provides a simple-to-use, easy-to-attach grinding attachment for the portable unit, in which no special attachment or support is necessary, which may be used to sharpen either knives or scissors blade by merely inverting the unit, which is simple in construction, which is easy to assemble and which is economical to manufacture.

While I have shown and described but a single embodiment of my invention, it is to be understood that that embodiment is to be taken as illustrative only and not in a limiting sense. I do not wish to be limited to the particular structure shown and described but wish to include all equivalent variations thereof except as limited by the scope of the claims.

I claim:

1. In combination, a portable power unit constructed to be supported on its heel in an upright position and having a pair of laterally spaced oppositely rotatable power take-off shafts extending generally horizontally therefrom when said power unit is supported in an upright position, said shafts being rotatable so that their adjacent sides move upwardly, and a grinding attachment including a casing having a pair of grinding wheels rotatably mounted therein, said mounting means including a pair of laterally spaced shafts extending laterally from the side of said casing being detachably connected to the power take-off shafts of said power unit so as to form the sole support for said grinding attachment, and a knife blade guide formed in one wall of said casing for guiding a knife blade in the proper relationship to said grinding wheels, said guide facing upwardly when said attachment is supported on said power unit with the latter in an upright position on its heel.

2. The combination defined in claim 1 in which the opposite side of said casing is formed with a scissors blade guide formed to guide a scissors blade in the proper relationship to one of said grinding wheels, and said attachments being invertible so that said scissors blade guide will face upwardly when the attachment is supported on said power unit with the latter in an upright position on its heel.

3. The combination as defined in claim 2 in which said scissors blade guide is in the form of a pair of guide surfaces at an acute angle relative to each other, one of said surfaces being positioned at an angle to one face of said grinding wheel so as to present the cutting edge of a scissors blade at an angle to said one face and the other of said surfaces being positioned to guide the cutting edge of the scissors blade along said one face.

4. The combination as defined in claim 2 including an ejector ring loosely mounted on one of said shafts and movable into contact with the casing of said power unit so as to exert an axial pressure to release said shafts from the driving shafts of the power unit whereby said attachment may be readily removed from said power unit.

5. The combination defined in claim 1 in which said grinding wheels are spaced axially of each other on their respective shafts so as to be slightly spaced apart relative to each other and in overlapping relationship so as to have grinding surfaces facing each other and said knife blade guide being positioned to guide a knife blade across said facing grinding surfaces.

6. The combination defined in claim 5 in which said facing grinding surfaces are in the form of facing beveled surfaces adjacent the peripheries of said grinding wheels and said knife blade guide is positioned to guide the opposite sides of a knife blade across said facing beveled surfaces at a point where they are moving upwardly relative to the sides of the knife blade whereby it is necessary to apply a slight downward pressure on the blade as it is moved along said knife blade guide.

7. The combination defined in claim 6 in which said guide means is positioned to guide the opposite faces of a knife blade in contact with said facing beveled surfaces at a point below the top of said grinding wheels where said surfaces are of arcuate form whereby the opposite sides of the knife blade will be hollow ground.

8. An attachment for detachable connection to the oppositely rotatable laterally spaced power shafts of a food mixer comprising, an elongate substantially rectangular casing, a pair of grinding wheels rotatably mounted in said casing, said mounting means including a pair of laterally spaced shafts extending a substantial distance from one side of said casing sufficient for detachable connection to said oppositely rotating power shafts and to form the sole support for said attachment, a guide slot formed on a second side of said casing adjacent said one side and shaped and positioned to guide a knife blade in proper relationship to the opposite sides of said grinding wheels for grinding the opposite sides of a knife blade, a third side of said casing opposite said second side being cut away to form a guide for guiding a scissors blade in the proper relationship to a grinding face of one of said grinding wheels, the arrangement being such that said attachment may be used in one position for grinding knife blades and in an inverted position for grinding scissors blades.

9. An attachment according to claim 8 including an ejector ring loosely mounted on one of said shafts and positioned to engage the casing of the power unit when tilted to exert an axial force for removing said attachment from said power unit.

10. A grinder attachment for detachable connection to the oppositely rotating laterally spaced power shafts of a food mixer comprising, an elongate substantially rectangular casing, a pair of laterally spaced shafts mounted for rotation in said casing and extending a substantial distance from one side thereof sufficient for detachable connection to said oppositely rotating power shafts so as to form the sole support for said attachment, a grinding wheel mounted within said casing on each of said shafts for rotation therewith, said grinding wheels being laterally spaced from each other with a portion of their faces facing each other, peripheral grinding faces formed on the sides of said grinding wheels which face each other for simultaneous engagement with the opposite sides of a knife blade and an upwardly facing slot formed in a side of said casing adjacent to said one side and shaped and positioned to guide a knife blade in the proper relationship to said peripheral grinding faces.

11. A grinder attachment according to claim 10 in which said peripheral grinding faces are in the form of beveled faces adjacent the periphery of said grinding wheels and said guide slot is positioned to guide the opposite sides of a knife blade into contact with said beveled faces.

References Cited in the file of this patent

UNITED STATES PATENTS

| | | |
|---|---|---|
| 522,373 | Hosack | July 3, 1894 |
| 757,843 | Rose | Apr. 19, 1904 |
| 1,184,517 | Burt et al. | May 23, 1916 |
| 1,742,707 | Holtzman | Jan. 7, 1930 |
| 2,098,098 | Jepson | Nov. 2, 1937 |
| 2,104,268 | Nielsen | Jan. 4, 1938 |
| 2,141,850 | Barry | Dec. 27, 1938 |
| 2,684,561 | Lindgren | July 27, 1954 |
| 2,694,275 | Lindsay et al. | Nov. 16, 1954 |